United States Patent [19]

Takahashi

[11] 4,321,653
[45] Mar. 23, 1982

[54] GROUNDING DEVICE FOR VEHICLES

[76] Inventor: Sakae Takahashi, 1-3-2 Yagiyamahoncho, Sendai-shi, Miyagi-ken, Japan

[21] Appl. No.: 156,418

[22] Filed: Jun. 4, 1980

[30] Foreign Application Priority Data

Jul. 16, 1979 [JP] Japan .................................. 54-89327

[51] Int. Cl.³ .............................................. H05F 3/02
[52] U.S. Cl. .............................. 361/219; 280/154.5 R
[58] Field of Search ............ 361/217, 219; 174/5 SG; 350/97, 98, 99, 100, 104, 105, 307; 280/152 R, 153 R, 154.5 R; 116/28 R

[56] References Cited

U.S. PATENT DOCUMENTS 2,318,340  5/1943  Thacher et al. ...................... 361/219
3,791,337  2/1974  Schamblin .............. 280/154.5 R X

FOREIGN PATENT DOCUMENTS 22564  5/1935  Australia ...................... 280/154.5 R
1474130  3/1967  France ............................... 361/217

*Primary Examiner*—Harry E. Moose, Jr.
*Attorney, Agent, or Firm*—Edward A. Sokolski

[57] ABSTRACT

A safety grounding device for vehicles having a conductive resilient strip adjustably suspended from the vehicle frame through a fixture attached to the base end portion thereof, to make a resilient contact with the ground at its lower end. A reflecting member is attached to a lower part of the conductive resilient strip to act as a traffic sign for the drivers of succeeding cars. The reflecting member is secured in such a manner as to be swung by the dynamic pressure of air during running of the vehicle but suspended vertically during deceleration or stopping due to reduced dynamic pressure of air, to inform the driver of the succeeding vehicle of the deceleration or stopping of the preceding vehicle. The reflecting member also functions as a weight for pulling the strip downwardly to eliminate the lateral swinging of the strip, thereby to enhance the chance of contact of the strip with the ground to release the electricity from the vehicle frame to the ground. The release of electricity is further insured by conductive metallic wires embedded in the conductive resilient strip to extend in the longitudinal direction of the latter. The fixture by which the strip is secured to the automobile frame is adjustable so that a worn out part of the strip is easily compensated for by manually pulling the strip after a loosening of the fixture.

11 Claims, 11 Drawing Figures

Fig. 1
PRIOR ART
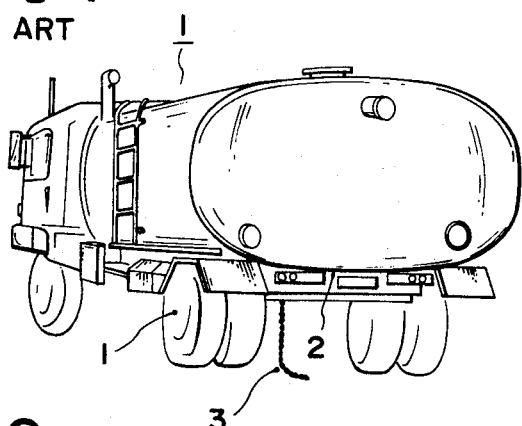
Fig. 2
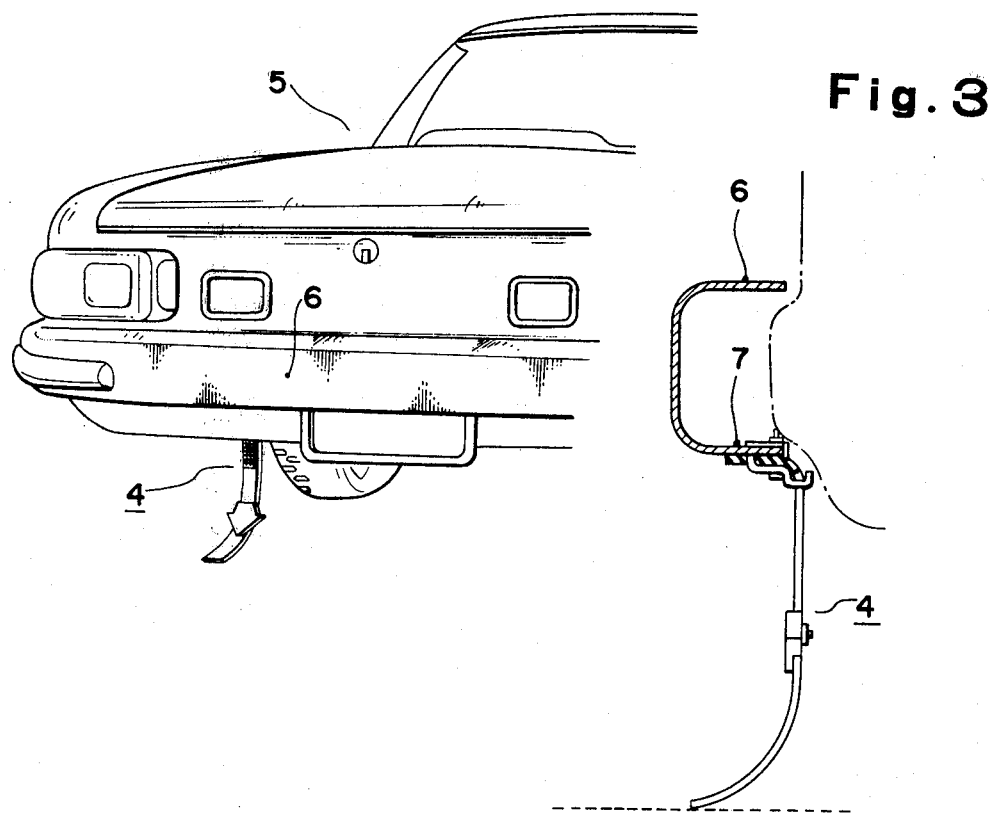
Fig. 3

Fig. 7
Fig. 8
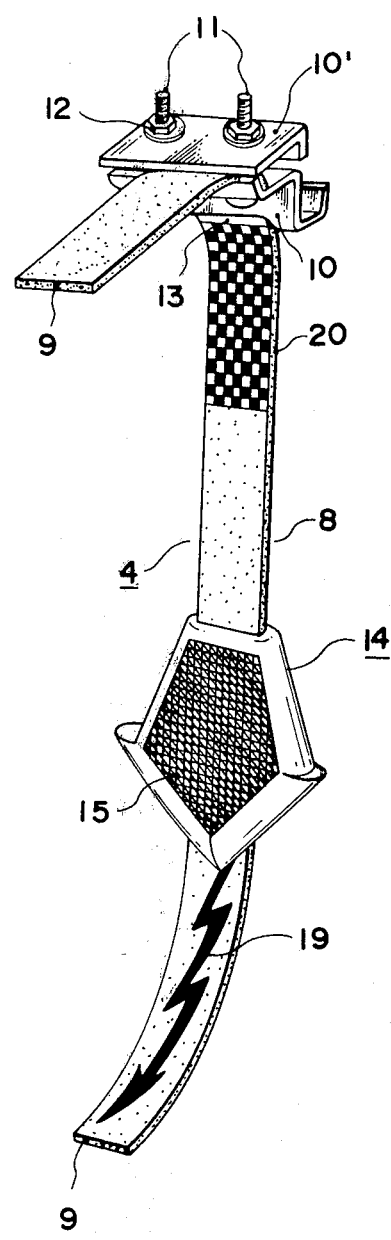
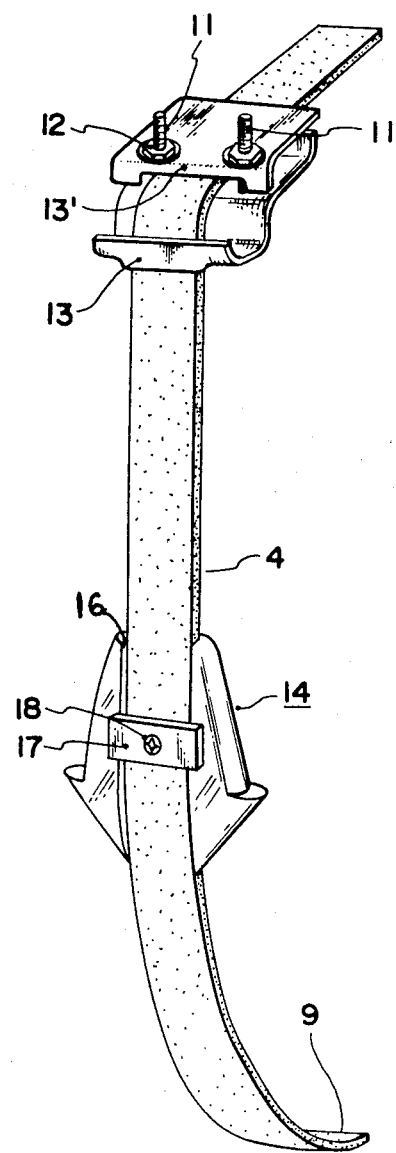

GROUNDING DEVICE FOR VEHICLES

BACKGROUND OF THE INVENTION

1. Field of the Invention

The present invention relates to a grounding device for vehicles adapted to be suspended from the vehicle frame to make contact with the ground, thereby to electrically ground the vehicle frame.

More specifically, the invention is concerned with a grounding device for vehicles which has a conductive flexible strip suspended from a vehicle frame and contacting at its lower end with the ground to ground leaked electricity, static electricity, lightning and the like. The conductive flexible strip suspended from the vehicle frame is made of a conductive resilient strip material such as of conductive rubber, resin or the like. The conductive flexible strip is provided at its upper end with a fixture for attaching the strip to the vehicle frame, in such a manner as to permit elongation, shrinkage and movement of the strip. The conductive resilient strip is further provided with a reflector member having the dual functions of weighting the strip downwardly and of a reflector for warning a following vehicle. Also, a conductive metal wire is embedded in the conductive resilient strip to ensure the electric grounding.

2. Description of the Prior Art

Hitherto, safety grounding devices have been used for vehicles such as trucks carrying inflammable cargo such as gasoline. This type of safety grounding device has, as shown in FIG. 1 for example, a chain 3 suspended from the frame 2 of the automobile 1 for discharging the static electricity to the ground to prevent an electric charge from building up which could cause an accident.

This prior art safety grounding device making use of a chain can provide a good grounding of the vehicle frame, but the chain 3 is inevitably worn out rapidly or broken due to its bounding on the ground during running of the vehicle, often resulting in a grounding failure. Thus, in some cases, this type of safety grounding device cannot provide adequate grounding.

In addition, since the chain 3 is simply suspended from the frame 2 by virtue of its weight, the end of the chain 3 often bounces off the ground. Also, the chain can make only a point contact with the ground. For these reasons, the conventional chain type safety grounding device is often inadequate in grounding, its grounding effect resulting in an incomplete discharge of the electricity. Also, the electrostatic charge tends to build up until it finally results in an electrical discharge between the chain and the ground which produces noise in the vehicle radio.

In addition, conventional safety grounding devices employing a chain often suffer a grounding failure due to the deterioration of conductivity attributable to the accumulation of mud, dust, or the like on the links of the chain.

Further, the conventional prior art chain safety grounding device involves a danger of sparking between the chain and the ground during loading and unloading of gasoline at the gas station.

Also, vehicles are often equipped with various electrical instruments such as a starter motor, electronic fuel injection controller, running monitor, automatic door, microcomputer and so forth, all of which are grounded at their minus terminals. In consequence, the wiring of leads and circuits in the panel can impose a hazard of fire due to sparking, electric shock and the like if there is improper grounding. Also, with improper grounding, the vehicle frame can become electrically charged which can cause failure of the radio equipment.

Further, the conventional prior art safety grounding devices are not capable of completely obviating the danger of lightning.

SUMMARY OF THE INVENTION

It is, therefore, a major object of the invention to provide a safety grounding device in which the conductive member suspended from the vehicle frame and contacting the ground comprises a conductive resilient strip having a conductive metal wire embedded therein, the strip having a fixture and a reflector member, thereby to overcome and eliminate the problems and shortcoming of the prior art.

Another object of the invention is to provide a novel safety grounding device for automobiles of an economical design, having a simplified construction with improved grounding.

BRIEF DESCRIPTION OF THE DRAWINGS

FIG. 1 is an illustration of a conventional prior art chain grounding device for vehicles;

FIG. 2 is a perspective view showing a preferred embodiment of the device of the invention installed in a vehicle;

FIG. 3 is a partly sectioned side elevational view of the embodiment shown in FIG. 2;

FIG. 7 is a rear perspective view of the embodiment shown in FIG. 4;

FIG. 8 is a perspective view of the embodiment shown in FIG. 4 as viewed from the front side thereof;

DETAILED DESCRIPTION OF THE PREFERRED EMBODIMENTS

Figure 4:
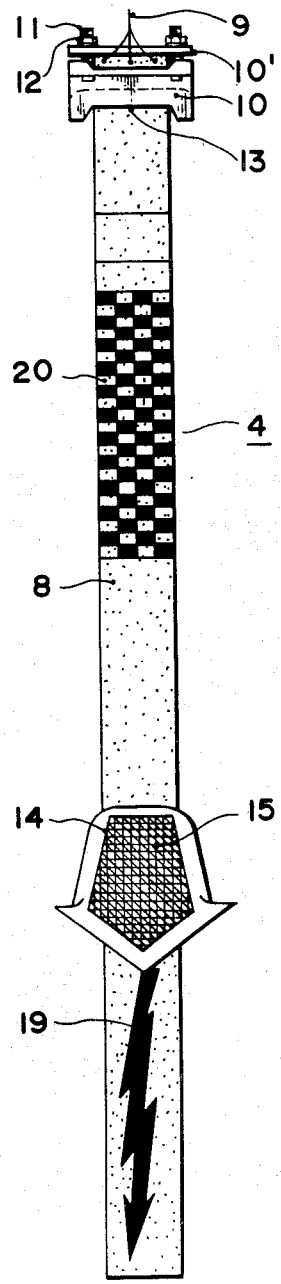
FIG. 4 is a front elevational view of the preferred embodiment of the invention.
Figure 6:
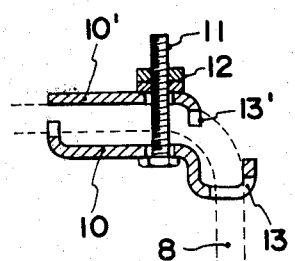
FIG. 6 is a longitudinal sectional view of the fixture of the embodiment shown in FIG. 4.
Figure 5:
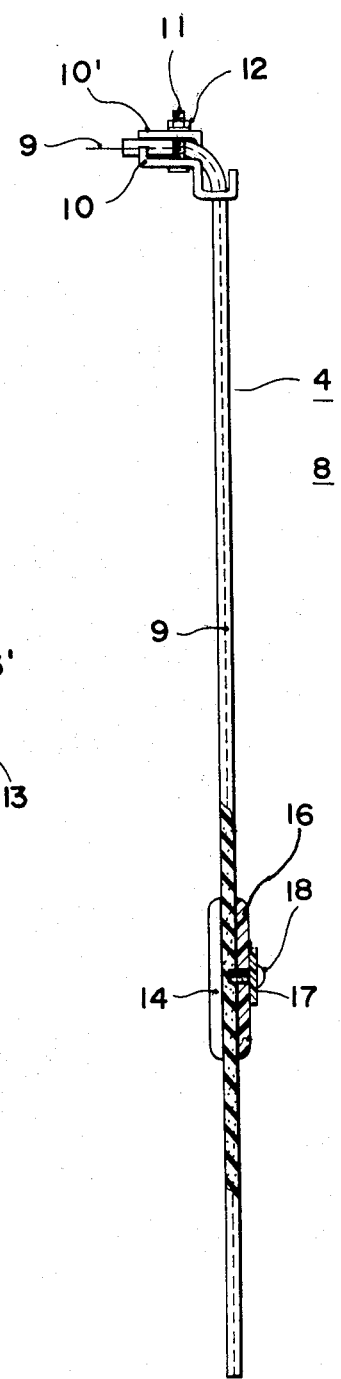
FIG. 5 is a partly sectioned side elevational view of the embodiment shown in FIG. 4.

Referring to FIGS. 2-8 showing a preferred embodiment of the invention, reference numeral 4 denotes generally a grounding device of the invention. This grounding device 4 is adapted to be attached in a manner to be described later to the lower inner flange 7 of a rear bumper 6 as an electrical extension of the frame of an automobile 5, as shown in FIG. 2. The grounding device 4 has a conductive resilient strip 8 which is a strip-shaped member as shown in FIGS. 4 and 5 and made of a rubber matrix having a conductive filler such as powders of conductive metal, carbon black, acetylene black, anti-charging agent or the like so as to impart conductivity thereto. In order to enhance the electrical conductivity, conductive metal wires may be embedded in the conductive resilient strip 8 such as to extend in the longitudinal direction of the strip. These wires are preferably of a highly conductive metal such as copper.

The base end of the conductive resilient strip 8 is clamped between two clamping plates 10, 10' by means of a bolt 11 and nut 12. Clamping plates 10, 10' are adapted to secure the conductive resilient strip 8 to the aforementioned bumper flange 7 as shown in FIG. 3. Clamping plate 10 is bent downwardly at a right angle to underhang and is provided near its end with a rectangular slit 13 through which the resilient strip 8 is passed and forcibly bent downwardly. The other clamping plate 10' is provided at its front side with a slit 13' which is also adapted to guide the resilient strip 8.

Reference numeral 14 denotes a reflecting member made of a suitable resin and having a weighting function. A suitable reflector plate 15 is attached to the rear side of the reflecting member 14. The reflector member 14 is provided at its reverse side with a groove 16 for fitting the resilient strip 8, so as to be fastened to the lower part of the resilient strip 8 by means of a clamping plate 17 and screws 18. It is possible to adjust the height of the reflecting member 14 in relation to the lower end of the resilient strip 8, by loosening the screw 18.

Reference numerals 19, 20 denote yellow marks of fluorescent paint provided on the surface of the resilient strip 8, and showing predetermined traffic sign and grounding sign.

In use, the grounding device 4 is attached to the lower flange 7 of the rear bumper 6 of the automobile 5, through the clamping plates 10, 10' attached to the base end portion of the resilient strip 8, by means of the bolts and nuts 11, 12, in such manner that the lower end of the resilient strip 8 contacts the ground in good electrical contact therewith and the reflector member weights the strip to take any slack out of it. The copper wires 9 are connected to the rear bumper 6 or other portion of the automobile body, by means of lead wires. The resilient strip 8 is suspended resiliently partly because it is bent by the plates 10, 10' and partly because it is stretched by the reflector member 14, and is made to contact the ground at its lower end.

During running of the vehicle, the vehicle is electrostatically charged by frictions of fluids and mechanical sliding parts both in and out of the vehicle. It is also possible that the automobile frame may be charged by electricity leaked from the aforementioned electric and electronic equipments, or even may be hit by lightning.

According to the invention, the automobile 5 as a whole is always grounded by the grounding device 4 to the earth which is at zero potential, not only when the automobile is stopped but also when the automobile is running. Thus, the automobile 5 is in a conductive state, so that any electrical charge on the body of the automobile 5 is completely discharged to the ground through the resilient strip 8 should the potential of the automobile body tend to increase.

The discharge of electricity is made not only through the resilient strip 8 but also through the copper wires 9 embedded in the latter. In addition, the resilient strip 8 makes a surface contact with the ground. For these reasons, the grounding device 4 of the invention exhibits an enhanced grounding capability.

The conductive resilient strip 8 is suspended from the rear bumper 6 through its bending at the plates 10, 10' and due to the weight of the reflector member 14. The flexibility and resiliency of the resilient strip 8 permits the strip to adapt to changes in the level of the ground. At the same time, the conductive resilient strip makes contact with the ground at its surface so that a larger contact area is insured. For these reasons, the grounding device 4 of the invention provides a safe and perfect grounding even during running of the automobile.

Further, the reflector 15 of the reflector member 14 warns the driver of the succeeding car at night, so that the driver of the succeeding car can follow the preceding car at a suitable distance and, if necessary, operate his brakes at a suitable time for safety.

A worn part of the end of the resilient strip 8 can be compensated for by pulling out the strip 8 to a suitable length after loosening the bolt and nut 11, 12 of the plates 10, 10' and the screws 18 of the reflecting member 14. Then, the bolt and nut 11, 12 are tightened and the reflector member 14 is thereby set to the optimum height, thereby to obtain a perfect grounding.

The static electricity generated by the frictioning of the vehicle body during washing thereof can also be released by the grounding device 4 of the invention.

The described embodiment may have variations. Namely, it is possible to attach the copper wires 9 to the surface of the conductive resilient strip 8 instead of embedding the same in the latter. It is also possible to use a suitable plastic material such as vinyl chloride as the matrix of the conductive strip, in place of rubber. In such case, the aforementioned conductive filler such as a carbon black is added to the plastic to impart the required electric conductivity thereto.

Figure 9:
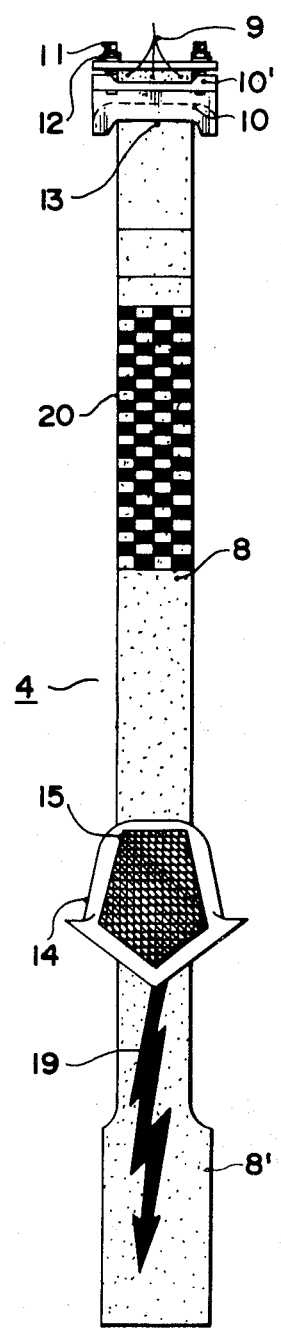
FIG. 9 is a front elevational view of a second embodiment of the invention.

FIG. 9 shows another embodiment in which the resilient strip is widened at its lower end 8'' to improve the durability.

It is also possible to coat or line the conductive resilient strip 8 at one or both sides thereof by a coating of aluminum or the like, to improve the reflecting and conducting functions.

Figure 10:
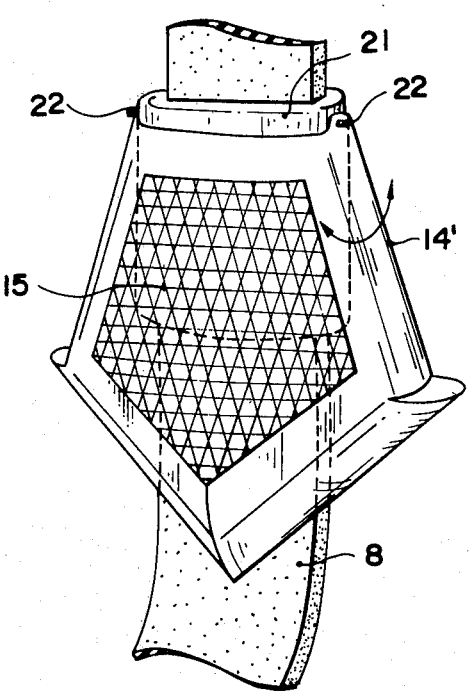
FIG. 10 is a perspective view of a second embodiment of the reflecting member of the invention attached to a grounding strap.
Figure 11:
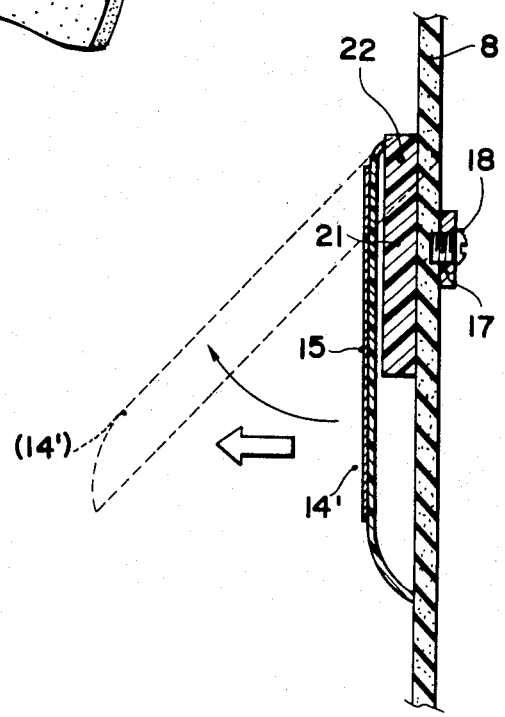
FIG. 11 is a sectional view of the reflecting member shown in FIG. 10, for explaining the operation thereof.

FIGS. 10 and 11 show still another embodiment in which a weight plate 21 provided at its back side unitarily with a clamping plate 17 has a pair of pins 22, 22 extending from both sides of the upper part thereof. An arrow mark reflecting member 14' having a diverging form, i.e., projecting laterally beyond the side edges of the resilient conductive strip 8 is made out of a suitable plastic material to have a flat major surface and curved front end as illustrated. This arrow mark reflector member 14' is pivotally supported at its upper end by the pins 22, 22. The surface of the arrow mark plate 14' is coated with a suitable reflecting plate 15.

This embodiment provides an equivalent grounding performance to those of the preceding embodiments. The grounding is insured by the weight of the weight plate 21. In addition, in this embodiment, the arrow mark reflecting member 14', which extends laterally beyond the side edges of the conductive strip 8 and pivotally secured at its upper end to the weight plate 21 by the pins 22, 22, is suspended vertically as shown by the solid lines in FIG. 11 when the automobile is decelerated by a braking operation or stopped, although it is inclined during running of the automobile due to the dynamic air pressure as shown by the broken lines in the same figure. Thus, the arrow mark reflecting member 14' performs a reflecting function to inform the driver of the succeeding car of the fact that the preceding automobile is decelerating or stopping, although it does not provide reflection while the vehicle is moving rapidly. This feature is quite advantageous from the viewpoint of safety. In this embodiment, it is possible to attach an additional small reflecting member to the surface of the weight plate 21. By so doing, the reflecting power is varied in accordance with the speed of the automobile.

It is also to be noted that the safety grounding device of the invention can be attached to various parts of the automobile other than the rear bumper, e.g. front bumper, lower frame of the chassis and so forth.

As has been described, according to the invention, there is provided a safety grounding device for vehicles comprising a conductive resilient strip adapted to be suspended from the vehicle frame, a fixture for securing the strip to the automobile frame and fixed to the base end portion of the strip in such a manner as to permit the adjustment of the position thereof in relation to the strip, and a reflecting member attached to the lower part of the strip in such a manner as to permit the adjustment of the position of the reflecting member with respect to the conductive resilient strip.

Thus, the safety grounding device of the invention exhibits a higher conductivity as compared with the conventional chain type grounding device which jumps and bounces to make an intermittent grounding, because the conductive resilient strip makes a surface contact with the ground and because the resiliency of the conductive resilient strip keeps the strip in contact with the ground, following the concavity and convexity of the ground surface. Thus, the safety grounding device of the invention effectively relieves not only the static electricity but also the electricity leaked from faulty electronic equipment to avoid electric shock. Further, an accident such as could be caused by lightning, the explosion of inflammable material due to sparking caused by discharge of static electricity and so forth are avoided.

It is also to be noted that the conductive resilient strip incorporated in the device of the invention is free from the problem of degradation of conductivity due to contamination by mud, dirt and the like, which may take place in the chain type grounding device consisting of a series of links, because the conductive resilient strip is continuous and integral.

The grounding device of the invention employing a resilient strip has a high wear resistance, so that it tends to have a low wear rate even with long-distance running of the vehicle. Even when the strip has been worn down, the fixture of the strip permits the strip to be manually pulled out to make up for the worn out part thereof. Thus, the grounding device of the invention has an almost semi-permanent service life which is quite advantageous from a viewpoint of economy.

The conductive resilient strip of the invention may be made of rubber or a plastic. Thus, the grounding device of the invention can be produced at a low cost. Also, the conductivity is maintained perfectly, and cutting or breakage are eliminated even with repeated use.

Further, since the conductive metal wires are embedded in the conductive resilient strip to extend in the longitudinal direction thereof between the base end and the free end, the resilient grounding pressure of the conductive resilient strip is further enhanced to reduce the discontinuity of the grounding. Also, the conductivity itself is further increased by the use of the metallic wires.

The grounding device of the invention, which is constructed to be attached to the automobile frame by a simple fixture, can be attached to the vehicle frame easily and promptly without requiring any specific skill.

The reflector member attached to the lower part of the conductive resilient strip functions as a weight to effectively pull the strip downwardly, thereby to suppress the tendency of bouncing of the strip to enhance the resilient contact of the strip with the ground, while improving the appearance of the device considerably. Of course, the reflecting member functions as a traffic signal, particularly at night.

In the embodiment in which the reflector member is pivotally secured to the strip, the reflector member is swung and tilted rearwardly during cruising, due to the dynamic pressure of air, but is suspended vertically during deceleration or stopping, due to reduced dynamic pressure of air, so that the driver of the succeeding car can be aware of the deceleration or stopping of the preceding car. This is quite advantageous from the viewpoint of safety, because the driver of the succeeding car can operate the brake with a sufficient margin of time.

Finally, it is to be noted that the grounding device of the invention can be produced at a low cost, and is maintenance free because of reduced chance of trouble.

What is claimed is:

1. A grounding device for vehicles comprising a flexible strip suspended from the frame of said automobile and contacting at its free end with the ground to said strip, characterized in that said conductive flexible strip is a conductive resilient strip, clamping fixture means attached to the upper portion of said strip for adjustable positioning longitudinally relative to said strip, and weighted reflecting means attached to the lower part of said conductive resilient strip for adjustable positioning longitudinally relative to said conductive resilient strip for weighting the strip to maintain said strip in a substantially longitudinal orientation and for providing a warning signal.

2. A grounding device for vehicles as claimed in claim 1, wherein at least one conductive metal wire is embedded in said conductive resilient strip and extends throughout the longitudinal extent of the strip.

3. A grounding device for vehicles as claimed in claim 1, wherein at least one conductive metal wire is attached to at least one surface of said conductive resilient strip and extends longitudinally of the strip between the opposite ends thereof.

4. A grounding device for vehicles as claimed in claims 2 or 3, wherein said conductive metal is a resilient metal.

5. A grounding device for vehicles as claimed in claim 1, wherein said conductive resilient strip is made of a conductive rubber.

6. A grounding device for vehicles as claimed in claim 1, wherein said conductive resilient strip is made of a resilient plastic.

7. A grounding device for vehicles as claimed in claim 1, wherein a traffic sign is provided on one side of said conductive resilient strip.

8. A grounding device for vehicles comprising a conductive flexible strip suspended from the frame of said vehicle and contacting at its free end with the ground characterized in that said conductive flexible strip is resilient, clamping fixture means attached to the top portion of said conductive resilient strip for adjustable positioning longitudinally relative to said strip, and a weighted reflecting member attached to a lower part of said conductive resilient strip for adjustable positioning longitudinally relative to said conductive resilient strip, said reflecting member being pivotally secured at its upper end portion to said conductive resilient strip so that it may be freely swung by the dynamic pressure of air which is generated as said vehicle runs.

9. A grounding device for vehicles as claimed in claim 8 and further including a weighted plate and wherein said reflecting member is pivoted at its upper end portion by means of pivot pins to said weighted plate, said weighted plate being adjustably secured to said conductive resilient strip, so that said reflecting member is swingable rearwardly by the dynamic pressure of air.

10. A grounding device for vehicles as claimed in claim 9, and an additional reflecting member being attached to said weighted plate.

11. A grounding device for vehicles as claimed in claim 8 wherein the lower end of said conductive resilient strip is widened as compared with the remaining portions of said strip.

* * * * *